US 011371479 B2

(12) United States Patent
Tomimatsu et al.

(10) Patent No.: US 11,371,479 B2
(45) Date of Patent: Jun. 28, 2022

(54) FUELING DEVICE

(71) Applicant: HONDA MOTOR CO., LTD., Tokyo (JP)

(72) Inventors: Masaru Tomimatsu, Wako (JP); Hiroyuki Nakagawa, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 354 days.

(21) Appl. No.: 16/666,880

(22) Filed: Oct. 29, 2019

(65) Prior Publication Data

US 2020/0141373 A1    May 7, 2020

(30) Foreign Application Priority Data

Nov. 1, 2018  (JP) .............................. JP2018206590

(51) Int. Cl.
*F02M 37/00* (2006.01)
*B60K 15/01* (2006.01)
*B60K 15/04* (2006.01)

(52) U.S. Cl.
CPC ....... *F02M 37/0017* (2013.01); *B60K 15/013* (2013.01); *B60K 15/04* (2013.01); *B60K 2015/0458* (2013.01); *B60K 2015/0474* (2013.01)

(58) Field of Classification Search
CPC .. F02M 37/0017; B60K 15/013; B60K 15/04; B60K 2015/0458; B60K 2015/0474
USPC ...................................................... 220/86.2
See application file for complete search history.

(56) References Cited

U.S. PATENT DOCUMENTS

| | | | |
|---|---|---|---|
| 4,113,286 A * | 9/1978 | Kennedy, Jr. ........... | F16L 3/127 248/62 |
| 10,006,565 B2 | 6/2018 | Kito et al. | |
| 2013/0192714 A1* | 8/2013 | Wagner ................... | B23P 19/00 141/98 |
| 2015/0274008 A1* | 10/2015 | Kito ....................... | B60K 15/04 141/311 R |
| 2017/0089491 A1* | 3/2017 | Kito ......................... | F16L 3/14 |
| 2019/0023125 A1* | 1/2019 | Costa ..................... | B65D 47/00 |
| 2021/0001717 A1* | 1/2021 | Wilhelm ................. | B60K 15/04 |
| 2021/0260991 A1* | 8/2021 | Shimojo ............ | B60K 15/0406 |
| 2021/0370763 A1* | 12/2021 | Majewski .............. | B60K 15/04 |

FOREIGN PATENT DOCUMENTS

| | | |
|---|---|---|
| JP | 2009073267 A | 4/2009 |
| JP | 5321444 B2 | 7/2011 |
| JP | 2011246046 A | 12/2011 |
| JP | 2017061262 A | 3/2017 |
| JP | 2017061263 A | 3/2017 |

OTHER PUBLICATIONS

JPO Notice of Reasons for Refusal for Japanese Patent Application 2018-206590 dated Aug. 5, 2020; 6 pp.

* cited by examiner

*Primary Examiner* — J. Gregory Pickett
*Assistant Examiner* — Niki M Eloshway
(74) *Attorney, Agent, or Firm* — Armstrong Teasdale LLP

(57) ABSTRACT

A fueling device mounted on a vehicle, includes: a flow path forming member forming a flow path extending from a fueling port to a fuel tank of the vehicle; and a stay joined to a vehicle body, wherein the stay supports an outer end portion of the flow path forming member.

11 Claims, 7 Drawing Sheets

FUELING DEVICE

TECHNICAL FIELD

The present invention relates to a fueling device that forms a flow path extending from a fueling port to a fuel tank.

BACKGROUND ART

Regarding vehicles such as automobiles, a fueling device for guiding the fuel injected from the fueling port to the fuel tank is known (see JP5321444B2, for example). The fuel supply device disclosed in JP5321444B2 includes, from the fueling port side, a fuel cap, a filler neck fuel constituting a part of a supply path, a fuel pipe connecting the filler neck and the fuel tank, and a pipe holding device joined to the vehicle body and supporting the fuel pipe. The pipe holding device supports a part of the fuel pipe spaced from the upstream end thereof.

At the time of fueling, the fueling nozzle is inserted into the filler neck. Thereby, a load is applied to the filler neck by the fueling nozzle. Since the fuel pipe disclosed in JP5321444B2 is supported by a part of the fuel pipe apart from the upstream end, the upstream end of the fuel pipe may deform due to the load from the fueling nozzle.

SUMMARY OF THE INVENTION

In view of the above background, a primary object the present invention is to provide a fueling device that includes a flow path forming member forming a flow path extending from a fueling port to a fuel tank and that can prevent a part of the flow path forming member near the fueling port from being bent downward and deformed by a load from the fueling nozzle at the time of fueling.

To achieve the above object, one embodiment of the present invention provides a fueling device (1) mounted on a vehicle, comprising: a flow path forming member (4) forming a flow path extending from a fueling port (2) to a fuel tank (3) of the vehicle; and a stay (36, 82, 92) joined to a vehicle body (35), wherein the stay supports an outer end portion (12) of the flow path forming member.

Thereby, the flow path forming member is supported by the vehicle body via the stay at the outer end portion thereof (or the end portion thereof on the side of the fueling port). As a result, when the fueling nozzle is inserted into the fueling port, the load from the fueling nozzle is transmitted to the vehicle body via the stay, and therefore, the deformation of the flow path forming member can be prevented.

Preferably, the flow path forming member includes a filler pipe (5) extending to the fuel tank and an outer tubular member (7) into which an outer end portion (12) of the filler pipe is inserted and which defines the fueling port, the stay is joined to the filler pipe via the outer tubular member, and the outer tubular member has s protrusion (25, 26, 81, 91) that protrudes radially outward and the stay supports the protrusion.

Thereby, in addition to preventing a part of the flow path forming member near the fueling port from being bent downward and deformed by a load from the fueling nozzle at the time of fueling, it is possible to have the outer tubular member be supported by the stay easily.

Preferably, the protrusion includes multiple tongues (25, 26) arranged to be spaced apart from one another in a circumferential direction.

Thereby, the outer tubular member can be supported by the stay stably in the circumferential direction.

Preferably, the stay is joined to the protrusion via a fastener, and the fastener includes multiple screws or pins (38, 41) which are inserted in mounting holes (27, 28, 37, 40) provided in the tongues and the stay and have mutually different axial directions.

Thereby, compared to a case where the outer tubular member is joined to the stay by means of multiple screws or clips having the same axial direction, positional variation at the time of assembly can be favorably prevented and the outer tubular member can be joined to the stay at a more proper position.

Preferably, the protrusion includes a pair of tongues (25, 26) arranged to be spaced apart from each other in the circumferential direction, and the stay has a base end (36A) joined to the vehicle body, a middle portion (36B) joined to one (25) of the tongues, and a free end (36C) joined to another (26) of the tongues.

Thereby, the stay extends along only one side of the outer circumference of the outer tubular member connecting between the two tongues, and therefore, a mounting space therefor can be secured easily.

Preferably, the tongues are arranged to be spaced apart from each other in the circumferential direction by an angle of about 180 degrees.

Thereby, the tongues are spaced apart from each other by the largest distance in the circumferential direction, and therefore, the stay and the outer tubular member are joined firmly.

Preferably, the mounting hole (27) provided in the one (25) of the tongues has an axis extending in a plane perpendicular to an axial direction of the outer tubular member and the mounting hole (28) provided in the other (26) of the tongues has an axis extending in parallel to the axial direction of the outer tubular member.

Thereby, the screws passed through the mounting holes of the tongues can have axial directions perpendicular to each other, and this favorably avoid positional variation between the outer tubular member and the stay.

Preferably, the fueling device further comprises: an electrically conductive inner tubular member (13) that covers an inner circumferential surface, an end surface, and an outer circumferential surface of the outer end portion of the filler pipe and is engaged with the filler pipe; and an electrically conductive spring piece (45) that is engaged with one of the stay and the inner tubular member and elastically abuts against another of the stay and the inner tubular member, wherein the stay is electrically conductive and is grounded via the vehicle body.

Thereby, the inner tubular member can be grounded via the spring piece and the stay. This prevents electrification of the outer end portion of the filler pipe.

Preferably, the outer tubular member is formed with a cutout (42) extending from an inner end thereof in an outward direction such that the spring piece is received in the cutout.

Thereby, with the spring piece received in the cutout, the spring piece can be brought into contact with the stay and the inner tubular member without being hindered by the outer tubular member.

Preferably, the inner tubular member is snap-fitted to the outer tubular member.

Thereby, the inner tubular member (or the filler pipe) can be easily joined to the outer tubular member after the outer tubular member is joined to the stay, and therefore, the assembly work is facilitated.

Preferably, a part of the flow path forming member on a downstream side of the outer end portion is joined to the vehicle body by use of an auxiliary stay (48, 94).

Thereby, the flow path forming member can be joined to the vehicle body more firmly.

According to the above configuration, it is possible to provide a fueling device that includes a flow path forming member forming a flow path extending from a fueling port to a fuel tank and that can prevent a part of the flow path forming member near the fueling port from being bent downward and deformed by a load from the fueling nozzle at the time of fueling.

DESCRIPTION OF THE PREFERRED EMBODIMENT(S)

In the following, a fueling device according to an embodiment of the present invention will be described. A fueling device is a device mounted on a vehicle, such as an automobile, running on fuel, for guiding the fuel injected from the fueling nozzle through the fueling port to the fuel tank. The fuel may be gasoline or light oil, for example.

Figure 1:
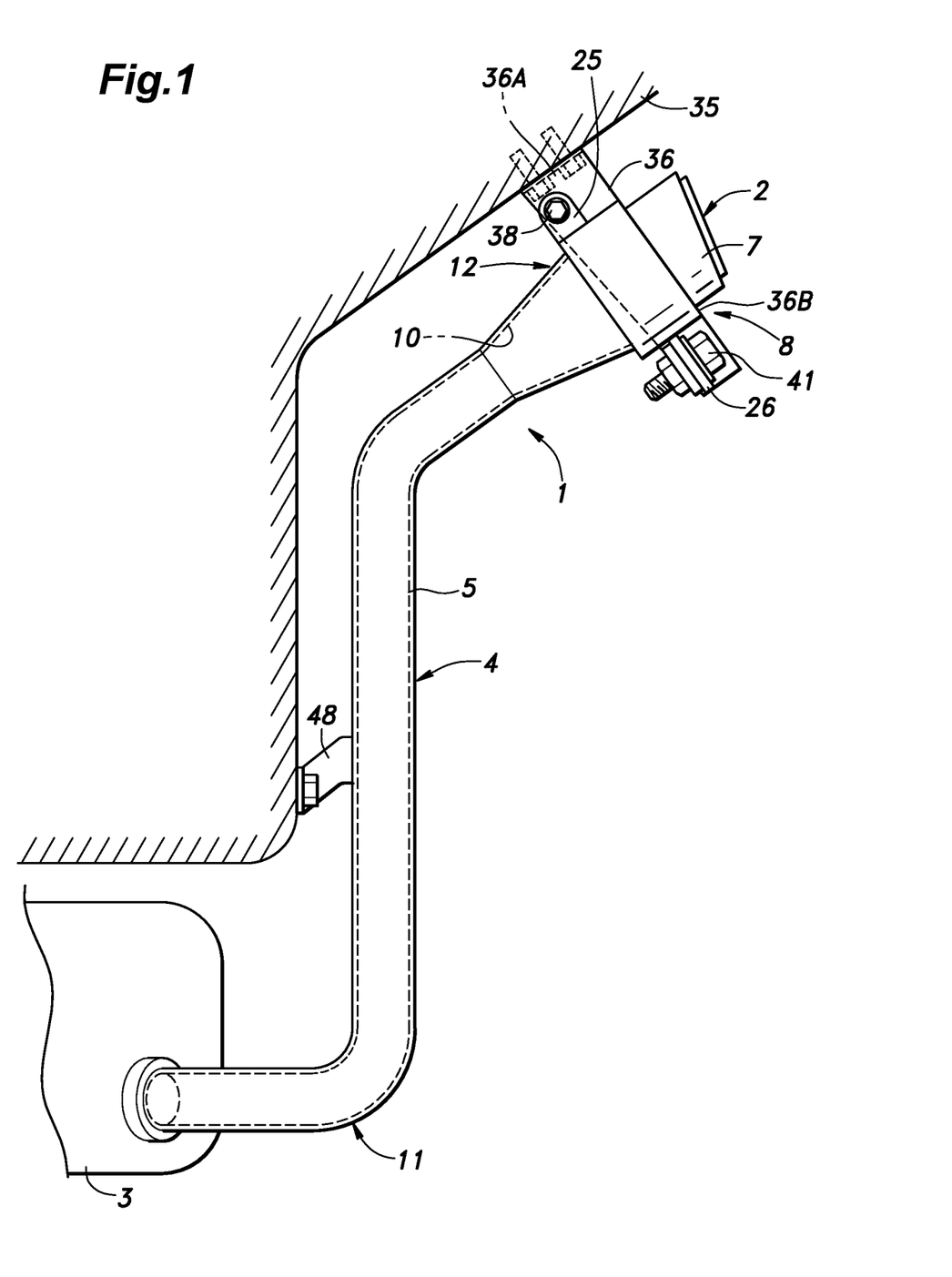
FIG. 1 is a side view of a fueling device according to an embodiment of the present invention.

As shown in FIG. 1, a fueling device 1 includes a flow path forming member 4 that forms a flow path for fuel extending from a fueling port 2 to a fuel tank 3. The flow path forming member 4 includes a filler pipe 5 having one end connected to the fuel tank 3 and an outer tubular member 7 into which the other end of the filler pipe 5 is inserted and which defines the fueling port 2. The flow path forming member 4 is arranged such that the fueling port 2 faces outward in the vehicle width direction. In the following description, the side of the fuel flow path adjacent to the fuel tank 3 will be referred to as a downstream side (or inboard side), and the side of the fuel flow path adjacent to the fueling port 2 will be referred to as an upstream side (or outboard side). The outer tubular member 7 is positioned in an outboard-side end portion 8 of the flow path forming member 4.

Figure 2:
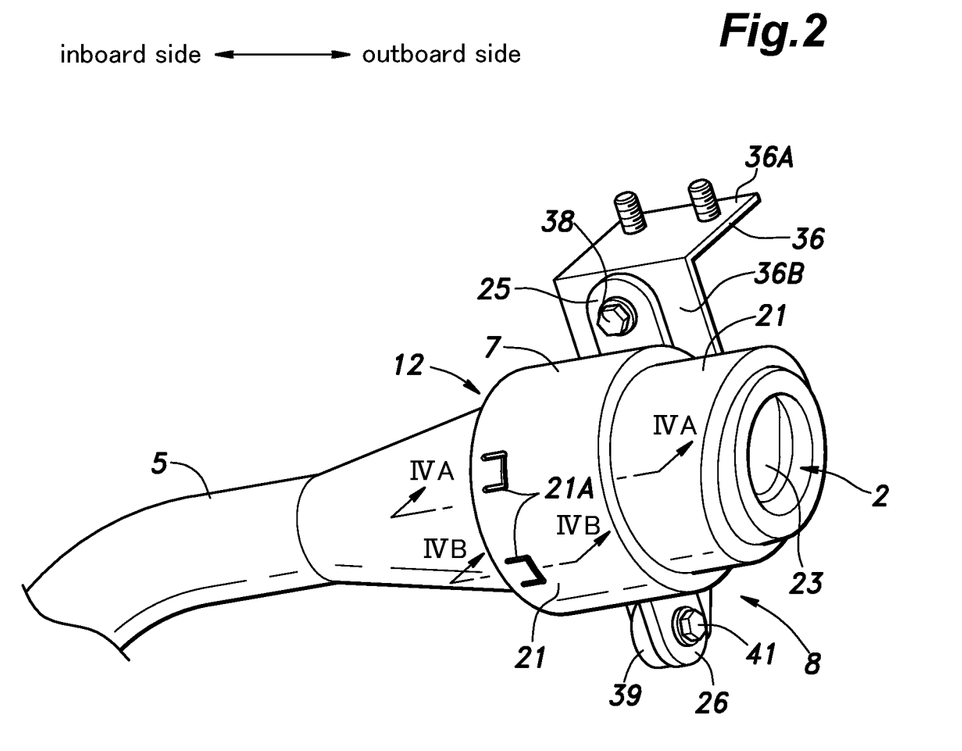
FIG. 2 is a perspective view of the fueling device.

The filler pipe 5 is a substantially cylindrical pipe member made of resin and has a pipe inner hole 10 that extends from one end to another end thereof. The filler pipe 5 has a multi-layer structure such that the filler pipe 5 has an electrically conductive inner surface. As shown in FIG. 1, the filler pipe 5 has a downstream-side (inboard-side) end portion (hereinafter referred to as an inner end portion 11) connected to the fuel tank 3. With the inner end portion 11 connected to the fuel tank 3, the pipe inner hole 10 is in communication with an interior of the fuel tank 3. As shown in FIG. 2, the filler pipe 5 has an upstream-side (outboard-side) end portion (hereinafter referred to as an outer end portion 12) defining a substantially circular opening and having a diameter gradually diminishing from upstream to downstream.

Figure 3:
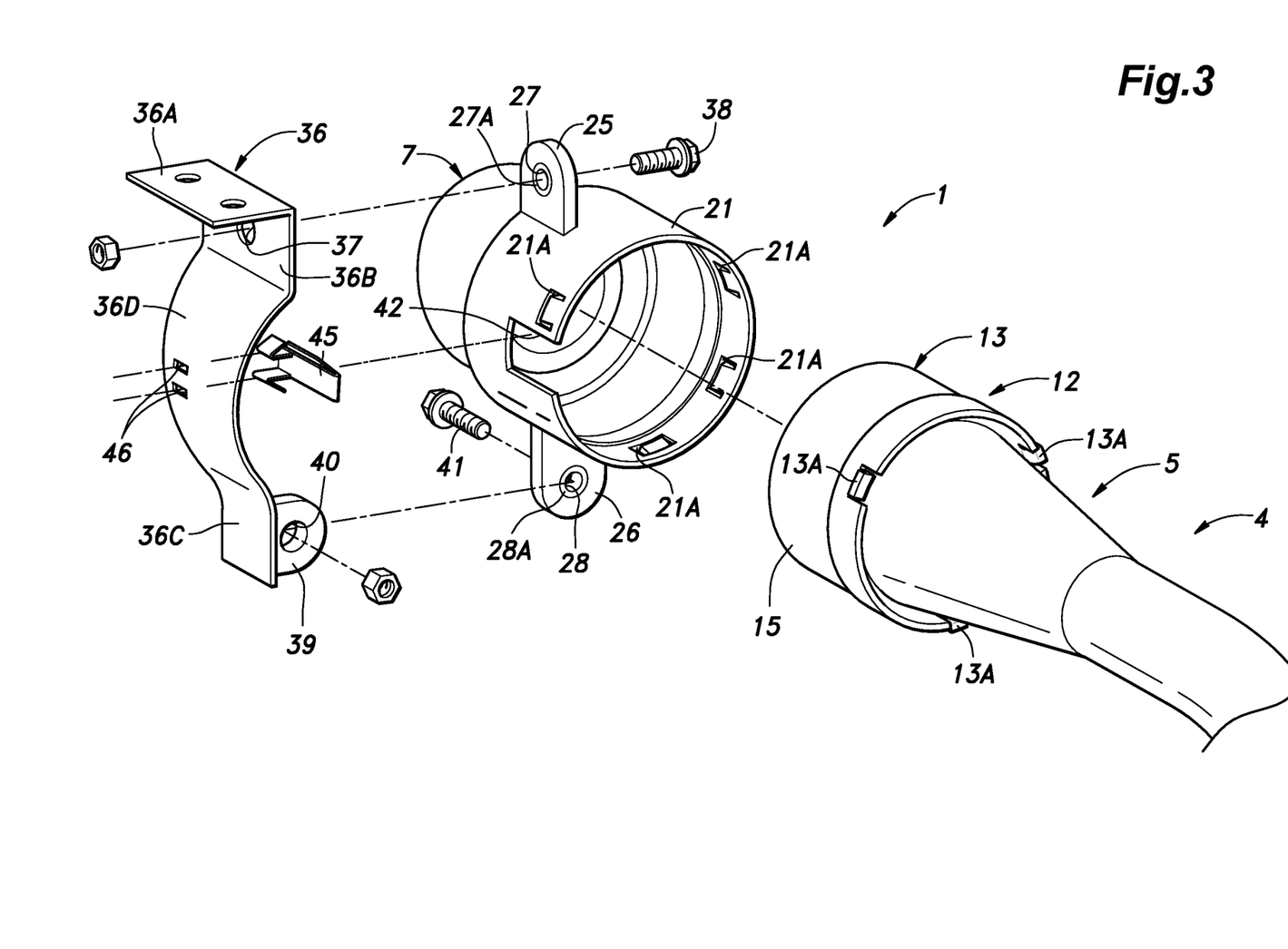
FIG. 3 is an exploded perspective view of the fueling device.

As shown in FIG. 3, an electrically conductive inner tubular member 13 made of metal is joined to the outer end portion 12 of the filler pipe 5. The inner tubular member 13 includes an inner tubular portion 14 (see FIG. 4A) which is cylindrical in shape and is in contact with an inner circumferential surface of the outer end portion 12 of the filler pipe 5, and an outer tubular portion 15 which is cylindrical in shape and is in contact with an outer circumferential surface of the filler pipe 5. The upstream ends of the inner tubular portion 14 and the outer tubular portion 15 are connected to each other by a connecting portion that extends radially along an end surface of the outer end portion 12 of the filler pipe 5. The inner tubular portion 14, the outer tubular portion 15, and the connecting portion are formed integrally. Thus, the inner tubular member 13 covers the inner circumferential surface, the end surface, and the outer circumferential surface of the outer end portion 12 of the filler pipe 5.

Figure 4A:
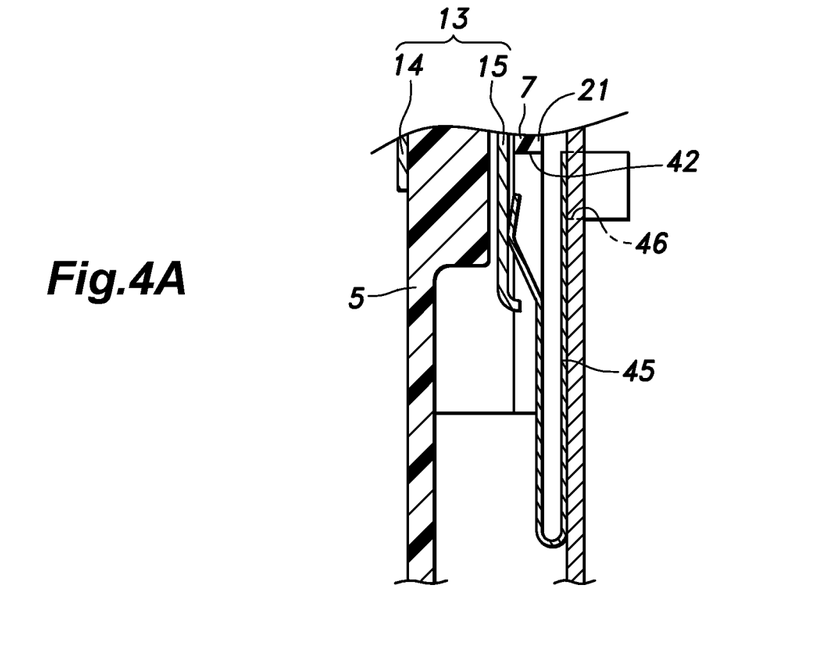
FIG. 4A is a sectional view taken along line IVA-IVA in FIG. 2
Figure 4B:
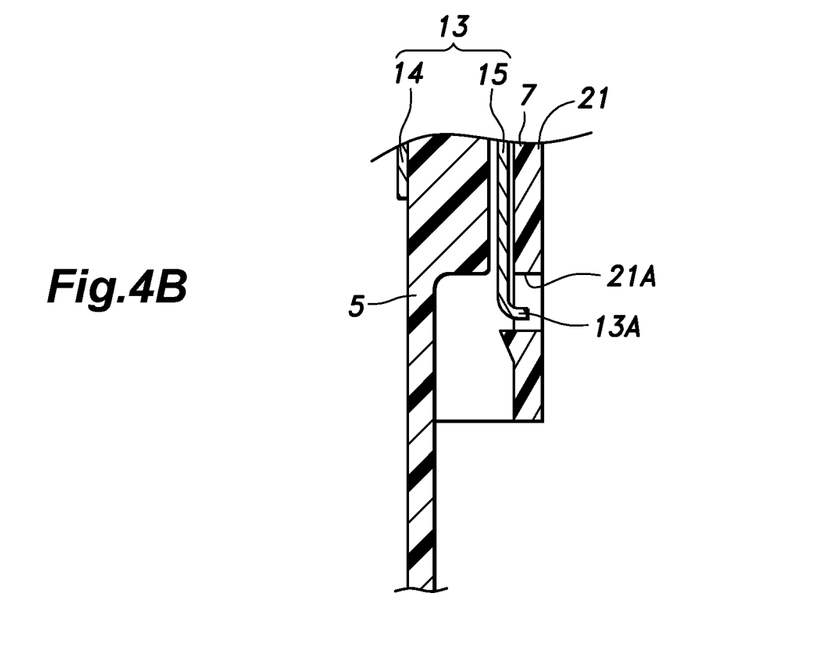
FIG. 4B is a sectional view taken along line IVB-IVB in FIG. 2.

The outer tubular member 7 is made of resin and includes a substantially cylindrical main body 21 and a pair of tongues 25, 26 (protrusions) that protrude radially outward from an outer circumferential surface of the main body 21. The main body 21 defines a substantially circular opening serving as the fueling port 2 in one end thereof, as shown in FIG. 2. In the present embodiment, the main body 21 is provided with a shutter 23 for opening and closing the fueling port 2. As shown in FIG. 3, the outer end portion 12 of the filler pipe 5 is inserted into the main body 21 of the outer tubular member 7 together with the inner tubular member 13 from the inboard side (opposite side from the fueling port 2). The main body 21 of the outer tubular member 7 is formed with multiple engagement holes 21A arranged in the circumferential direction and each extending therethrough in the thickness direction. The outer tubular portion 15 of the inner tubular member 13 is provided, on an inboard-side edge portion thereof, with multiple engagement claws 13A each being defined between a pair of cuts (notches) made in the edge portion and bent to protrude radially outward. When the outer end portion 12 of the filler pipe 5 is inserted into the main body 21 of the outer tubular member 7, the engagement claws 13A of the inner tubular member 13 joined to the outer end portion 12 resiliently flex radially inward by being pushed by the inboard-side end of the main body 21 and, when aligned with the respective engagement holes 21A of the main body 21, are fitted into the respective engagement holes 21A as shown in FIG. 4B. Thus, the outer tubular member 7 and the filler pipe 5 are joined to each other by snap-fitting the inner tubular member 13 joined to the outer end portion 12 of the filler pipe 5 to the main body 21 of the outer tubular member 7. It is to be noted, however, that the way of joining the outer tubular member 7 and the filler pipe 5 is not limited to this. For example, a configuration may be made such that the outer tubular member 7 is provided with engagement claws that protrude radially inward to engage with holes or recesses formed in the inboard-side end portion of the outer tubular portion 15 of the inner tubular member 13.

As shown in FIG. 3, one tongue 25 (hereinafter, the first tongue 25) is plate-shaped and protrudes substantially radially from an outer circumferential surface of the outer tubular member 7 to define a wall surface parallel with the axial direction of the outer tubular member 7. The first tongue 25 is provided with a first mounting hole 27 that extends therethrough in the thickness direction. Thus, the axis of the first mounting hole 27 extends in a plane perpendicular to the axial direction of the outer tubular member 7. The other tongue 26 (hereinafter, the second tongue 26) also is plate-shaped and protrudes substantially radially from the outer circumferential surface of the outer tubular member 7. The second tongue 26 defines a wall surface perpendicular to the axial direction of the outer tubular member 7 and is provided with a second mounting hole 28 that extends therethrough in the thickness direction. Thus, the axis of the second mounting hole 28 extends in parallel to the axial direction of the outer tubular member 7. The first tongue 25 and the second tongue 26 are arranged on the outer circumferential surface of the outer tubular member 7 to be spaced apart from each other in the circumferential direction. Specifically, in the present embodiment, the first tongue 25 and the second tongue 26 are arranged on the outer circumferential surface of the outer tubular member 7 to define an angle of about 180 degrees therebetween in the circumferential direction. As a result, the first tongue 25 and the second tongue 26 protrude in directions away from each other.

As shown in FIG. 1, the fueling device 1 includes a stay 36 for joining the filler pipe 5 to a vehicle body 35. The stay 36 is an electrically conductive member made of a metallic plate extending substantially vertically. Specifically, as shown in FIG. 3, the stay 36 includes an upper end portion 36A (base end) that is bent substantially horizontally, a middle portion 36B extending downward from an edge of the upper end portion 36A that opposes the outer tubular member 7, and a lower end portion 36C (free end) continuous with the lower end of the middle portion 36B. The stay 36 is fastened the vehicle body 35 at the upper end portion 36A thereof by means of metallic bolts. The vehicle body 35 herein refers to a metallic frame (members) forming the skeleton of the vehicle or a metallic panel mounted on the frame. With the stay 36 fastened to the vehicle body 35, the stay 36 is grounded via the vehicle body 35.

As shown in FIG. 1, the stay 36 is arranged such that when the stay 36 is fastened to the vehicle body 35, the main surface of the middle portion 36B faces substantially in the fore-and-aft direction of the vehicle. As shown in FIG. 3, the middle portion 36B includes, in a substantially vertically central part thereof, a curved portion 36D that is curved substantially in an arc shape. The outer tubular member 7 is arranged to contact the curved portion 36D. A part of the middle portion 36B above the curved portion 36D is provided with a middle portion mounting hole 37 to extend therethrough in the thickness direction at a position aligned with the first mounting hole 27 formed in the first tongue 25 of the outer tubular member 7. The first tongue 25 of the outer tubular member 7 is fastened to the middle portion 36B by means of a metallic first screw 38 passed through the first mounting hole 27 and the middle portion mounting hole 37. At this time, the axis of the first screw 38 (i.e., the axis of the first mounting hole 27) extends substantially in the fore-and-aft direction of the vehicle, as shown in FIG. 2.

In the present embodiment, as shown in FIG. 3, an annular press-fit component 27A made of metal is inserted into the first mounting hole 27. The inserted press-fit component 27A functions to prevent the first tongue 25 from buckling due to a tightening force (axial force) applied thereto when tightening the first screw 38.

As shown in FIGS. 2 and 3, the lower end portion 36C is provided with a support piece 39 that protrudes in the fore-and-aft direction of the vehicle (in the forward direction in the present embodiment). As shown in FIG. 2, the support piece 39 forms a wall having a surface that faces outboard. The support piece 39 is provided at a position aligned with the second tongue 26 of the outer tubular member 7. As shown in FIG. 3, the support piece 39 is provided with a lower portion mounting hole 40 extending therethrough in the thickness direction at a position aligned with the second mounting hole 28 formed in the second tongue 26 of the outer tubular member 7. The second tongue 26 of the outer tubular member 7 is positioned to overlap the support piece 39 from the outboard side and is fastened to the support piece 39 by means of a metallic second screw 41 passed through the second mounting hole 28 and the lower portion mounting hole 40.

In the present embodiment, as shown in FIG. 3, an annular press-fit component 28A made of metal is inserted into the second mounting hole 28 to prevent the second tongue 26 from buckling due to an axial force applied thereto when tightening the second screw 41.

At this time, as shown in FIG. 1, the axis of the second screw 41 (i.e., the axis of the second mounting hole 28) extends substantially in the vehicle width direction, and the axial direction of the second screw 41 differs from the axial direction of the first screw 38. Thus, the outer tubular member 7 is fastened to the stay 36 using the two screws 38, 41 having mutually different axial directions. As a result, compared to a case where the outer tubular member 7 is fastened to the stay 36 using multiple screws having the same axial direction, the outer tubular member 7 can be joined to the stay 36 at a more proper position. Further, the first tongue 25 and the second tongue 26 are provided at circumferentially different positions. Thereby, compared to a case where the first tongue 25 and the second tongue 26 are positioned at a circumferentially same position, the outer tubular member 7 can be joined to the stay 36 at a more proper position. In addition, the first tongue 25 and the second tongue 26 are arranged to be spaced apart from each other in the circumferential direction by an angle of about 180 degrees. Thereby, the first tongue 25 and the second tongue 26 are spaced apart from each other by the largest distance in the circumferential direction, and therefore, the stay 36 and the outer tubular member 7 are joined firmly.

In the present embodiment, the outer tubular member 7 is fastened to the stay 36, with the first tongue 25 fastened to the middle portion mounting hole 37 by means of the metallic first screw 38 and the second tongue 26 fastened to the lower portion mounting hole 40 by means of the metallic second screw 41. However, the present invention is not limited to such an embodiment. For example, the outer tubular member 7 may be fastened to the stay 36 by use of pins (rivets) passed through the mounting holes 27, 28 of the tongues 25, 26 and the mounting holes 37, 40 of the stay 36, instead of the screws 38, 41. Namely, the fastener for fastening the outer tubular member 7 to the stay 36 may include screws or pins inserted through the mounting holes 27, 28 provided in the tongues 25, 26 and the mounting holes 37, 40 provided in the stay 36.

As shown in FIG. 3, the outer tubular member 7 is formed with a substantially rectangular cutout 42 that extends outboard (namely, outward or in the upstream direction) from the downstream-side (inboard-side) end (or inner end) of the outer tubular member 7, such that the cutout 42 receives therein a spring piece 45 formed of a metallic plate. The spring piece 45 is electrically conductive, is engaged with engagement holes 46 which are through-holes formed in the middle portion 36B of the stay 36, and elastically contacts the inner tubular member 13 through the cutout 42. By thus forming the cutout 42 in the outer tubular member 7 and arranging the spring piece 45 to pass through the cutout 42, the spring piece 45 can be brought into contact with the stay 36 and the inner tubular member 13 without being hindered by the outer tubular member 7, as shown in FIG. 4A. Thereby, the spring piece 45 electrically connects the stay 36 and the inner tubular member 13, and the inner tubular member 13 is grounded via the spring piece 45, the stay 36, and the vehicle body 35. With the inner tubular member 13 grounded, electrification of the outer end portion 12 of the filler pipe 5 can be prevented.

As shown in FIG. 1, the filler pipe 5 is additionally joined to the vehicle body 35 by use of an auxiliary stay 48 at a position downstream of the joint portion with the outer tubular member 7. Thereby, the flow path forming member 4 can be joined to the vehicle body 35 more firmly.

Next, the effects and advantages of the fueling device 1 configured as above will be described. The outer tubular member 7 is joined to the vehicle body 35 via the stay 36. Thereby, the outer end portion 12 of the filler pipe 5 is joined to and supported by the vehicle body 35 via the stay 36. Namely, the flow path forming member 4 is supported by the vehicle body 35 at the outboard-side end portion (the outer tubular member 7) thereof. Therefore, when the fueling nozzle is inserted into the fueling port 2, the outboard-side end portion of the flow path forming member 4 is supported by the vehicle body 35 via the stay 36.

At the time of fueling, the outboard-side end portion (or the end portion on the side of the fueling port 2) of the flow path forming member 4 is applied a downward load from the fueling nozzle. Since the outboard-side end portion of the flow path forming member 4 is supported by the vehicle body 35 via the stay 36 as described above, it is possible to prevent the end portion of the flow path forming member 4 near the fueling port 2 from being bent downward and deformed.

The stay 36 extends vertically and is joined to the first tongue 25 at the middle portion 36B thereof and to the second tongue 26 at the lower end portion 36C (free end) thereof. Thus, the provision of the first tongue 25 and the second tongue 26 on the outer tubular member 7 allows the outer tubular member 7 to be joined to the stay 36 easily using the first screw 38 and the second screw 41. The stay 36 is arranged to extend along one side of the outer circumference of the outer tubular member 7 (with respect to the fore-and-aft direction of the vehicle) connecting between the first tongue 25 and the second tongue 26. Thereby, compared to a case where the stay 36 is provided to extend along the entire outer circumference of the outer tubular member 7, the stay 36 can be made smaller in size. By making the size of the stay 36 smaller, it becomes easier to secure an assembly space when the outer tubular member 7 is assembled to the stay 36.

A concrete embodiment of the present invention has been described in the foregoing, but the present invention should not be limited by the foregoing embodiment and various modifications and alterations are possible within the scope of the present invention. For instance, in the foregoing embodiment, the spring piece 45 was engaged with the engagement holes 46 of the stay 36, but the present invention is not limited to such a configuration and may have any configuration for engaging the spring piece 45 with the stay 36 in an electrically connected manner. Alternatively, the spring piece 45 may be engaged with the inner tubular member 13 and resiliently contact the middle portion 36B of the stay 36.

Figure 5A:
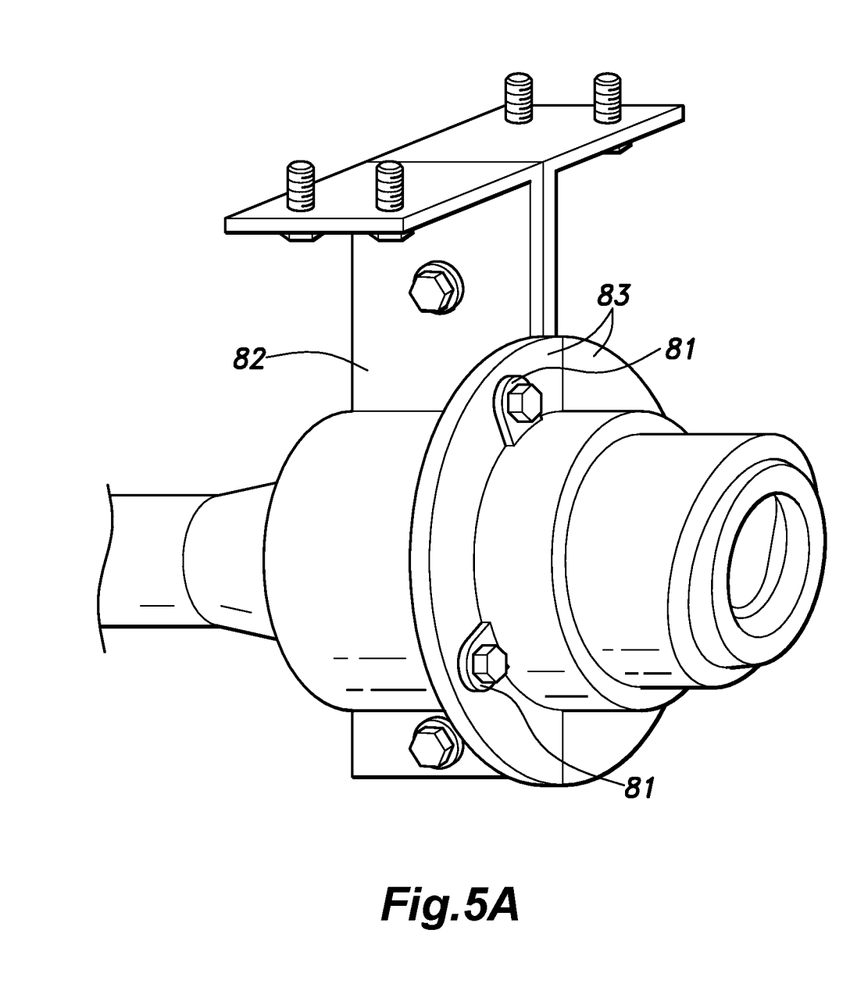
FIG. 5A is a perspective view of an upstream end portion of a fueling device according to a first modification and FIG. 5B is a front view of the same as viewed from the fueling port side.
Figure 5B:
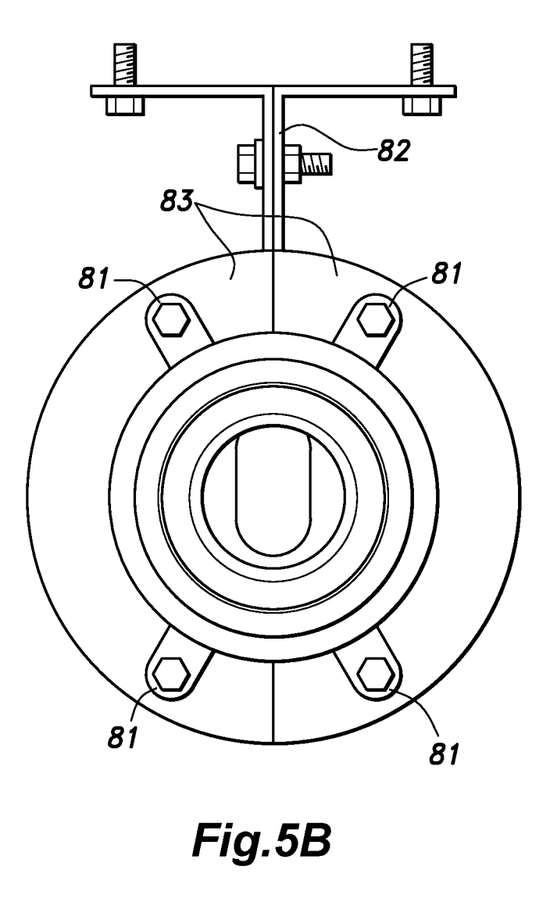

Further, in the foregoing embodiment, the outer tubular member 7 was provided with two tongues 25, 26, but may be provided with three or more tongues. For example, as shown in a modification (first modification) of FIG. 5, the outer tubular member 7 may be provided with two or more (four in the first modification) tongues 81 protruding in directions orthogonal to the extending direction of the outer tubular member 7. In the first modification, a stay 82 is joined to the vehicle body 35 and provided with a support wall 83 having a wall surface facing outboard and the support wall 83 is fastened to the tongues 81. Preferably, the tongues 81 are arranged at a substantially equal interval in the circumferential direction and the support wall 83 is provided to extend over the substantially entire circumference of the outer tubular member 7 in the circumferential direction. Thereby, the outer tubular member 7 is joined to the stay 82 at positions spaced in the circumferential direction, and this allows the outer tubular member 7 to be supported by the stay 82 more stably and to be joined to the stay 82 more firmly.

Figure 6A:
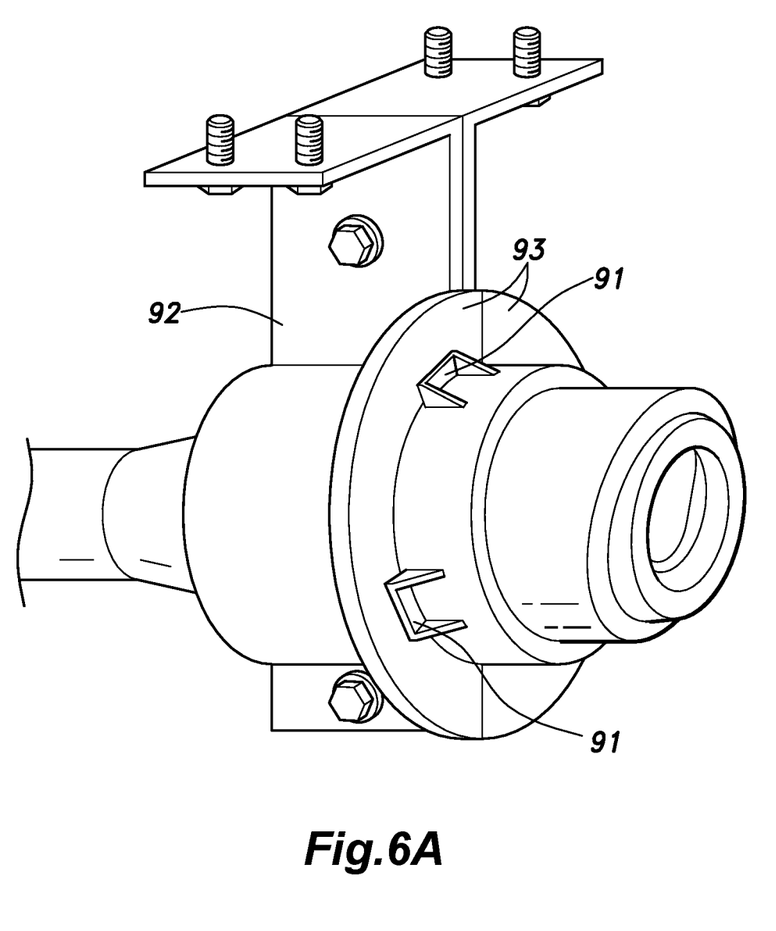
FIG. 6A is a perspective view of an upstream end portion of a fueling device according to a second modification and FIG. 6B is a front view of the same as viewed from the fueling port side.
Figure 6B:
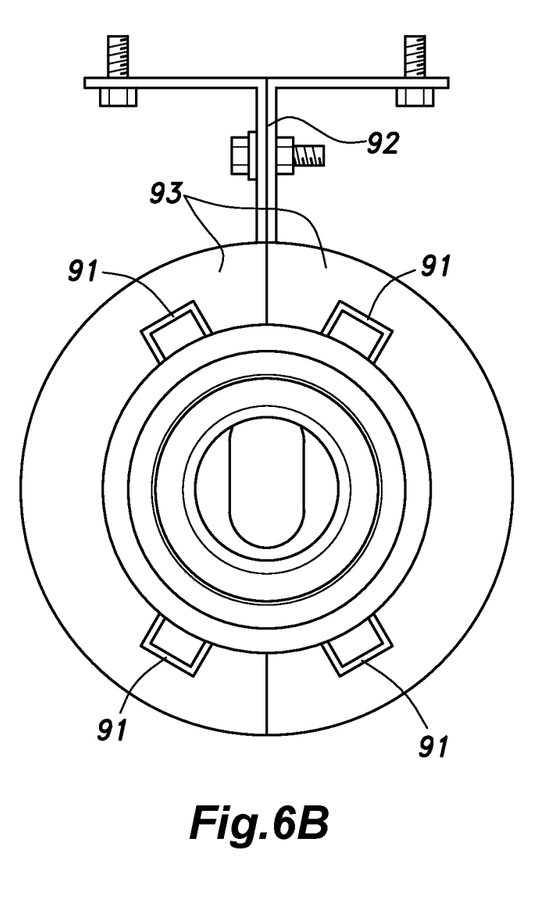
Figure 7:
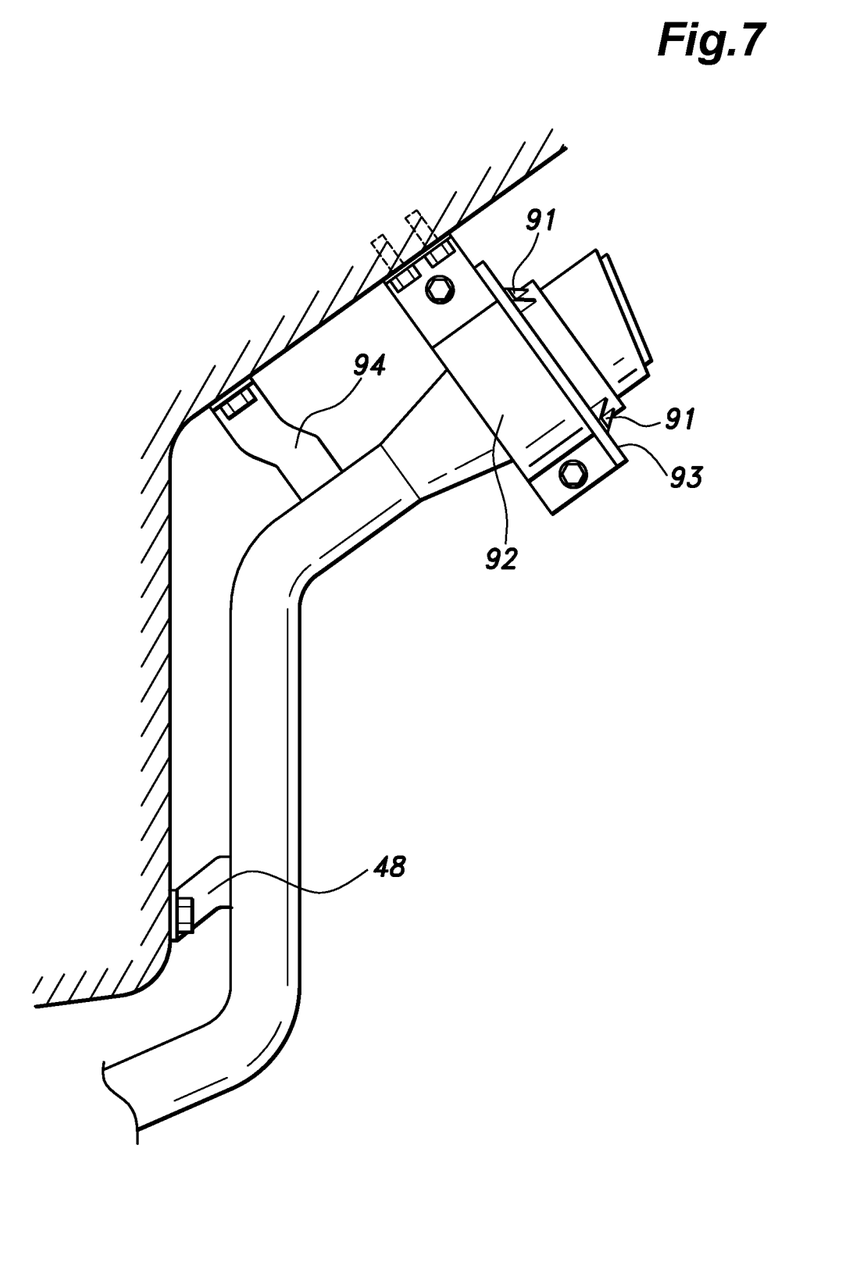
FIG. 7 is a side view of the fueling device according to the second modification.

Also, the stay 36 and the outer tubular member 7 do not necessarily have to be fastened to each other, and the stay 36 may support the outer tubular member 7 from the inboard side. Specifically, as shown in a modification (second modification) of FIG. 6, the outer tubular member 7 may be provided with protruding pieces 91 that protrude radially outward, a stay 92 may be joined to the vehicle body 35 and provided with a support wall 93 having a surface facing outboard, and the protruding pieces 91 are supported by the support wall 93 from the inboard side. As in the first modification mentioned above, preferably, the protruding pieces 91 are arranged at a substantially equal interval in the circumferential direction, and the support wall 93 is provided to extend over the substantially entire circumference of the outer tubular member 7 in the circumferential direction. Thereby, the outer tubular member 7 is stably supported by the stay 82 at positions spaced in the circumferential direction. Further, as shown in FIG. 7, to join the filler pipe 5 to the vehicle body 35 more reliably, a second auxiliary stay 94 that joins the filler pipe 5 to the vehicle body 35 may be provided at a position apart from the fueling port 2.

The invention claimed is:

1. A fueling device mounted on a vehicle, comprising:
 a flow path forming member forming a flow path extending from a fueling port to a fuel tank of the vehicle,
 a stay joined to a vehicle body,
 an electrically conductive inner tubular member; and
 an electrically conductive spring piece that is engaged with one of the stay and the electrically conductive inner tubular member and elastically abuts against another of the stay and the electrically conductive inner tubular member,
 wherein the stay supports an outer end portion of the flow path forming member,
 wherein the flow path forming member includes a filler pipe extending to the fuel tank and an outer tubular member into which an outer end portion of the filler pipe is inserted and which defines the fueling port, the stay is joined to the filler pipe via the outer tubular member, and the outer tubular member has a protrusion that protrudes radially outward and the stay supports the protrusion;
 wherein the stay is electrically conductive and is grounded via the vehicle body; and
 wherein the electrically conductive inner tubular member covers an inner circumferential surface, an end surface, and an outer circumferential surface of the outer end portion of the filler pipe and is engaged with the filler pipe.

2. The fueling device according to claim 1, wherein the protrusion includes multiple tongues arranged to be spaced apart from one another in a circumferential direction.

3. The fueling device according to claim 2, wherein the stay is joined to the protrusion via a fastener, and the fastener includes multiple screws or pins which are inserted in mounting holes provided in the tongues and the stay and have mutually different axial directions.

4. The fueling device according to claim 3, wherein one of the mounting holes for the fastener inserting provided in the one of the tongues has an axis extending in a plane perpendicular to an axial direction of the outer tubular member and one of the mounting holes for the fastener inserting provided in another of the tongues has an axis extending in parallel to the axial direction of the outer tubular member.

5. The fueling device according to claim 2, wherein the protrusion includes a pair of tongues arranged to be spaced apart from each other in the circumferential direction, and the stay has a base end joined to the vehicle body, a middle portion joined to one of the tongues, and a free end joined to another of the tongues.

6. The fueling device according to claim 5, wherein the tongues are arranged to be spaced apart from each other in the circumferential direction by an angle of about 180 degrees.

7. The fueling device according to claim 1, wherein the outer tubular member is formed with a cutout extending from an inner end thereof in an outward direction such that the electrically conductive spring piece is received in the cutout.

8. The fueling device according to claim 1, wherein the electrically conductive inner tubular member is snap-fitted to the outer tubular member.

9. The fueling device according to claim 1, wherein a part of the flow path forming member on a downstream side of the outer end portion is joined to the vehicle body by use of an auxiliary stay.

10. A fueling device mounted on a vehicle, comprising:
a flow path forming member forming a flow path extending from a fueling port to a fuel tank of the vehicle; and
a stay joined to a vehicle body,
wherein the stay supports an outer end portion of the flow path forming member,
wherein the flow path forming member includes a filler pipe extending to the fuel tank and an outer tubular member into which an outer end portion of the filler pipe is inserted and which defines the fueling port, the stay is joined to the filler pipe via the outer tubular member, and the outer tubular member has a protrusion that protrudes radially outward and the stay supports the protrusion,
wherein the protrusion includes multiple tongues arranged to be spaced apart from one another in a circumferential direction,
wherein the stay is joined to the protrusion via a fastener, and the fastener includes multiple screws or pins which are inserted in mounting holes provided in the tongues and the stay and have mutually different axial directions; and
wherein one of the mounting holes for the fastener inserting provided in the one of the tongues has an axis extending in a plane perpendicular to an axial direction of the outer tubular member and one of the mounting holes for the fastener inserting provided in another of the tongues has an axis extending in parallel to the axial direction of the outer tubular member.

11. A fueling device mounted on a vehicle, comprising:
a flow path forming member forming a flow path extending from a fueling port to a fuel tank of the vehicle; and
a stay joined to a vehicle body,
wherein the stay supports an outer end portion of the flow path forming member,
wherein the flow path forming member includes a filler pipe extending to the fuel tank and an outer tubular member into which an outer end portion of the filler pipe is inserted and which defines the fueling port, the stay is joined to the filler pipe via the outer tubular member, the outer tubular member has a protrusion that protrudes radially outward and the stay supports the protrusion,
wherein the protrusion includes multiple tongues arranged to be spaced apart from one another in a circumferential direction; and
wherein the stay is joined to the protrusion via a fastener, and the fastener includes multiple screws or pins which are inserted in mounting holes provided in the tongues and the stay, and axes of the screws or the pins are directed in mutually different directions so that the axes intersect each other or are positioned in a skew relationship, respectively.

\* \* \* \* \*